United States Patent [19]
Krakovyak

[11] Patent Number: 5,940,402
[45] Date of Patent: Aug. 17, 1999

[54] METHOD AND APPARATUS FOR TDM INTERRUPT TRANSMISSIONS BETWEEN MULTIPLE DEVICES AND A PROCESSOR

[75] Inventor: Michael Krakovyak, East Hanover, N.J.

[73] Assignee: Timeplex, Inc., Woodcliff Lake, N.J.

[21] Appl. No.: 08/870,817

[22] Filed: Jun. 6, 1997

[51] Int. Cl.[6] ........................................... H04J 3/00
[52] U.S. Cl. ............................................. 370/461; 370/498
[58] Field of Search .................... 370/442, 443, 370/449, 451, 458, 461, 498

[56] References Cited

U.S. PATENT DOCUMENTS

| | | | |
|---|---|---|---|
| 4,161,786 | 7/1979 | Hopkins et al. | 710/45 |
| 4,500,991 | 2/1985 | Lubcke et al. | 370/88 |
| 4,511,969 | 4/1985 | Koenig et al. | 364/200 |
| 4,586,040 | 4/1986 | Akiba et al. | 340/825.08 |
| 4,601,029 | 7/1986 | Hargrave et al. | 370/67 |
| 4,604,618 | 8/1986 | Akiba et al. | 340/825.06 |
| 4,771,425 | 9/1988 | Baran et al. | 370/458 |
| 4,791,629 | 12/1988 | Burns et al. | 370/85 |
| 4,811,561 | 3/1989 | Edwards et al. | 60/368 |
| 4,984,234 | 1/1991 | Vergnaud et al. | 370/58.1 |
| 5,027,349 | 6/1991 | Thorne | 370/85.1 |
| 5,144,295 | 9/1992 | Nakagawa et al. | 340/825.12 |
| 5,311,576 | 5/1994 | Brunson et al. | 379/89 |
| 5,455,959 | 10/1995 | Simmering | 395/800 |
| 5,594,727 | 1/1997 | Kolbenson et al. | 370/442 |
| 5,682,385 | 10/1997 | Garcia et al. | 370/458 |
| 5,842,007 | 11/1998 | Tarsky et al. | 395/566 |

*Primary Examiner*—Huy D. Vu
*Assistant Examiner*—Jasper Kwoh
*Attorney, Agent, or Firm*—Irwin Ostroff; Erwin Pfeifle

[57] ABSTRACT

Apparatus provides time division multiplex (TDM) transmissions of interrupt requests between a plurality of shelves to a microprocessor mounted on one of the shelves. The shelves are interconnected with a cable wherein one lead is dedicated for the transmission of interrupt data signals to the microprocessor. Each shelf includes a plurality of ports or elements that are monitored and initiate interrupt request signals when a request for an action occurs therein for processing by the microcomputer. A separate encoder is mounted on each of the shelves for converting an interrupt request signal from an element on the same shelf into an X-bit interrupt data signal identifying that element. The bits of the X-bit interrupt data signal are serially transmitted over the one lead of the cable during a separate plurality of at least X clock cycles forming a timeslot assigned to the shelf originating the interrupt request within a frame period. The encoder on the shelf with the microprocessor receives the X-bit interrupt data signal and generates a Y-bit signal including the received X-bit interrupt data and a Z-bit code identifying the shelf originating the X-bit interrupt data signal as determined from the timeslot in the frame period in which the X-bit interrupt data signal was received. This Y-bit signal is transmitted to the microprocessor for processing.

16 Claims, 3 Drawing Sheets

METHOD AND APPARATUS FOR TDM INTERRUPT TRANSMISSIONS BETWEEN MULTIPLE DEVICES AND A PROCESSOR

FIELD OF THE INVENTION

The present invention relates to method and apparatus for providing interrupt request transmissions between a plurality of devices or shelves and a single microprocessor using time division multiplexing.

BACKGROUND OF THE INVENTION

Various remote monitoring and control systems have been suggested using time division multiplex transmissions which include interruption processing techniques.

U.S. Pat. No. 4,586,040 (Akiba et al.), issued on Apr. 29, 1986, discloses a interruption handling system in a TDMA remote control system. The TDMA remote control system comprises a plurality of terminals connected to a central controller through a signal line. The format for a transmission signal from the central controller includes a interruption request signal stand-by period "RW" when the central controller accepts interruption request reply signals from the terminals. The terminals are formed into separate sets of terminals, each set having a group identifying information. In a terminal, the interruption request signal identifying the terminal in the group is transmitted during this stand-by period. The stand-by period is divided into a plurality of subperiods corresponding to the group identifying information for a group of terminals to which the terminal belongs to. The individual identifying information sent out as a reply signal is coded information of a plurality of bit wherein the signal of a single bit is represented by a combination of one pulse having a longer pulse width and another pulse having a shorter pulse width, or vice versa. The central controller detects the combination of two pulses having a longer pulse width in each bit of the individual identifying information and thereby can detect that there exists in a single group of terminals more than two terminals sending out interruption request signals. Possible addresses are evaluated based on the bit position(s) where such combination(s) are detected so that only the terminals corresponding to the possible addresses can be polled.

U.S. Pat. No. 5,144,295 (Nakagawa et al.), issued on Sep. 1, 1992, discloses an interruption processing system in a TDMA transmission system. The system comprises a central control unit interconnected by a pair of signal lines to a plurality of monitoring terminal units and a plurality of controlling terminal units, where each of the terminal units has a specific address. A transmission signal "VS" is transmitted from the central control unit to the respective terminals, and a signal "Vb" is selectively returned from a terminal. The interruption processing system from one of the monitoring units returns to the central control unit a signal which specifies in part of a 4-bit address which group that terminal unit is in (one of four groups of four terminal units each). Such notification of which group the terminal is in is provided to the central control unit by one or more current mode pulse signals within one of four periods within a designated Start (ST) pulse period. Such transmission of current mode pulses identifies the group which contain the interruption request terminal and avoids the need for the central control unit to access all terminal units, so that the specifying operation of the interruption requesting terminal can be attained extremely quickly.

U.S. Pat. No. 4,604,618 (Akiba et al.), issued on Aug. 5, 1986, discloses a TDMA transmission system comprising a host machine 3 and a plurality of addressable terminals connected together by a signal line. The terminals are grouped in sets with each set having a same address. Each of the terminals in a set includes selection switches associated with separate objects to be monitored for selecting one of reply blocks at which a reply signal associated with that object is sent to the host machine. Each terminal of a set has its selections switches set to select a different one of the reply blocks in a reply signal so that no data from the terminals overlaps. In this manner, the host machine can interrogate a set of terminals by sending out a single address, and the data returned from the set of addressed terminals is dependent upon which of the selection switches is turned "ON". The host machine has a record of which reply blocks belong to which terminal of the set of terminals with the same address and the object in that terminal that is being monitored. It thereby can supervise the objects to be monitored in each set of terminals of the system by sending out the address associated with each separate set of terminals.

It is desirable to provide a technique which permits interrupt request transmissions between a plurality of devices or shelves and a single microprocessor that identifies by an encoded interrupt data signal precisely what device or what device or port on a shelf is requesting an interrupt using time division multiplexing and a minimal amount of leads. This avoids the necessity of a microprocessor having to subsequently determine which device or element on a shelf is requesting an interruption once an interrupt request is received.

SUMMARY OF THE INVENTION

The present invention is directed to method and apparatus for providing uniquely encoded interrupt request transmissions between a plurality of devices or shelves and a single microprocessor that identifies precisely what port or element on a shelf is requesting an interrupt using time division multiplexing and a minimal amount of leads between the shelves.

Viewed from one aspect, the present invention is directed to apparatus for providing time division multiplex (TDM) transmissions of interrupt requests comprising a plurality of M shelves and a microprocessor. The plurality of M shelves are coupled to a cable wherein one lead is dedicated for the transmission of interrupt data signals to all of the other shelves. Each shelf comprises a plurality of elements, each element being capable of transmitting an interrupt request signal in response to a need for an action therein, and encoding means. The encoding means converts each received interrupt request signal from the plurality of elements into an X-bit encoded interrupt data signal which uniquely identifies the element on the shelf initiating the interrupt request. The encoding means then selectively transmits the X-bit interrupt data signal to the other shelves over the one lead of the cable in a timeslot within a frame period that is dedicated to the shelf. Each timeslot comprises X clock cycles and each bit of the X-bit encoded interrupt data signal is serially transmitted during separate one of the X clock cycles in the timeslot assigned to the shelf. The microprocessor is mounted on a predetermined one of the plurality of shelves for processing a Y-bit signal that comprises the X-bit encoded interrupt data signal and a Z-bit code identifying the shelf from which the X-bit encoded interrupt data signal originated which is transmitted to the microprocessor from the encoding means located on the predetermined one of the plurality of shelves.

Viewed from another aspect, the present invention is directed to apparatus for providing time division multiplex (TDM) transmissions of interrupt requests comprising a plurality of M shelves, and a microprocessor. The plurality of M shelves are coupled in parallel by a cable of which one lead is dedicated for the transmission of interrupt data signals to each of the other shelves. Each shelf comprises a plurality of elements that are each monitored and transmit an interrupt request signal in response to a need for an action therein, and an encoder. Each encoder comprises a plurality of parallel terminals and a serial terminal that is coupled to the one lead of the cable. The encoder is adapted for receiving and converting each interrupt request signal received from the plurality of elements into an X-bit encoded interrupt data signal that identifies the element on the shelf requesting the interrupt. The encoder then selectively transmits the X-bit interrupt data signal over the one lead of the cable in a timeslot within a frame period that is dedicated to the shelf. Each timeslot comprises X clock cycles and each bit of the X-bit encoded interrupt data signal is serially transmitted over the one lead of the cable during a separate one of the X clock cycle of a timeslot during a frame period assigned to each shelf. The microprocessor is mounted on a predetermined one of the plurality of shelves for processing a Y-bit interrupt data signal which is transmitted to the microprocessor in parallel from the encoder located on the predetermined one of the plurality of shelves. The Y-bit signal comprises the X-bit encoded interrupt data signal identifying the element on a shelf requesting an interrupt and a Z-bit code identifying the shelf from which the X-bit encoded interrupt data signal originated as determined from the timeslot in which the X-bit interrupt data signal is received.

Viewed from still another aspect, the present invention is directed to a method of providing time division multiplex (TDM) transmissions of interrupt requests. In a first step, a plurality of M shelves are coupled to a cable wherein one lead thereof is dedicated for the transmission of interrupt data signals to all of the other shelves. In a second step, an interrupt request signal is transmitted from an element on any one of the plurality of M shelves to an encoding means mounted on that same shelf in response to a request for action in the element. In a third step, the interrupt request signal received in the encoding means in the second step is converted into an X-bit encoded interrupt data signal which uniquely identifies the element on the shelf initiating the interrupt request. In a fourth step, the X-bit encoded interrupt data signal generated in the third step is selectively transmitted over the one lead of the cable to all of the other shelves during a predetermined timeslot within a frame period that is dedicated to the shelf. Each timeslot comprises X clock cycles and each bit of the X-bit encoded interrupt data signal is serially transmitted during a separate one of the X clock cycles in the timeslot assigned to the shelf. In a fifth step, the X-bit encoded interrupt data signal transmitted in the fourth step is received in an encoding means mounted on a predetermined one of the plurality of shelves and generates a Y-bit signal that is transmitted to a microprocessor mounted on the predetermined one of the plurality of shelves. The Y-bit signal comprises the received X-bit encoded interrupt data signal and a Z-bit code identifying the shelf from which the X-bit encoded interrupt data signal originated.

The invention will be better understood from the following more detailed description taken with the accompanying drawings and claims.

The drawings are not necessarily to scale.

DETAILED DESCRIPTION

It is to be understood that corresponding elements performing the same function in the several figures of the drawings are provided with the same designation numbers.

Figure 1:
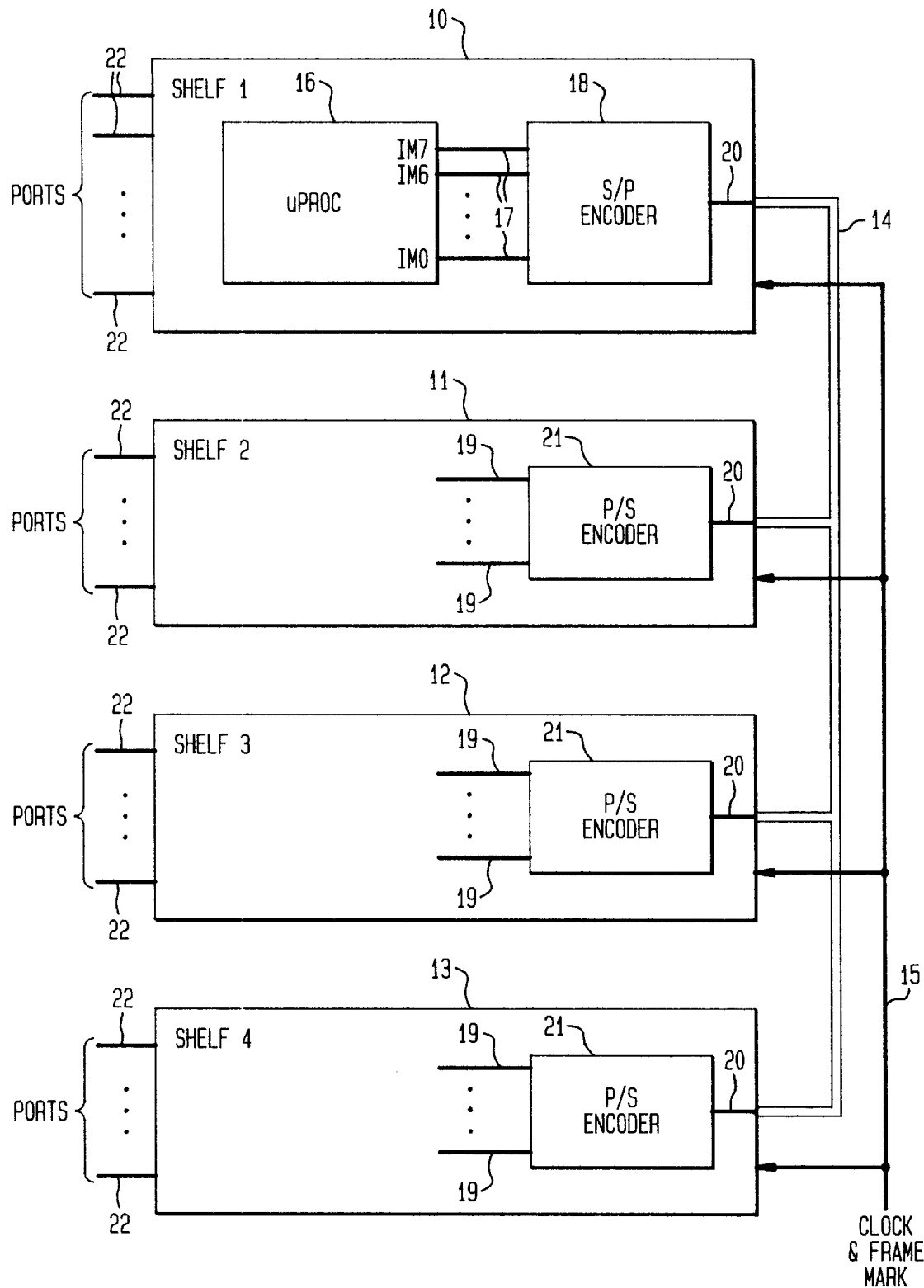
FIG. 1 is block diagram of a plurality of shelves that are interconnected to provide encoded interrupt data signal transmissions to one microprocessor in one of the shelves, where each encoded interrupt data signal precisely identifies which device, element, or port on a shelf is requesting an interrupt in accordance with the present invention.

Referring now to FIG. 1, there is shown block diagram of a plurality of four shelves 10, 11, 12, and 13 that are interconnected in parallel by a lead 20 of a ribbon cable 14 to provide encoded interrupt data transmissions to a microprocessor (uPROC.) 16 located in the shelf 10 in accordance with the present invention. More particularly, shelf 10 comprises the microprocessor 16 which is coupled via a plurality of leads 17 to a corresponding plurality of parallel ports of a serial-to-parallel encoder (S/P ENCODER) 18 located in shelf 10. Each of the other shelves 11, 12, and 13 also includes a parallel-to-serial encoder (P/S ENCODER) 21. The serial-to-parallel encoder 18 and the parallel-to-serial encoders 21 each include a serial port (not shown) which is coupled to the one lead 20 of the ribbon cable 14 that is dedicated for transmitting encoded interrupt data signals to all of the other shelves 10–13. A lead 15 is coupled in parallel to the shelves 10, 11, 12, and 13 for transmitting clock and frame mark signals from a clock device (not shown) to each of the shelves 10, 11, 12, and 13.

In shelf 10, the lead 20 from the ribbon cable 14 is coupled to a serial port of the serial-to-parallel encoder 18 for receiving serially encoded interrupt data signals from the shelves 11, 12, and 13. The serial-to-parallel encoder 18 in shelf 10 demultiplexes the serially encoded interrupt data signals received via lead 20 into parallel encoded interrupt data signals. The leads 17 are coupled to eight parallel ports of the serial-to-parallel encoder 18 for the transmission of 8-bit parallel interrupt data signals from the serial-to-parallel encoder 18 to the microprocessor 16.

Each of the other three shelves 11, 12, and 13 comprises a separate parallel-to-serial encoder (P/S) 21 which is coupled via each of leads 19 to separate devices (not shown) that monitor a plurality of ports 22 in the associated shelf 11, 12, or 13, and on the other side to the one lead 20 of the ribbon cable 14. Each parallel-to-serial encoder 21 in shelves 11, 12, and 13 is arranged to convert or multiplex interrupt request signals received via leads 19 from the devices (not shown) in the associated shelf 11, 12, or 13 into corresponding 5-bit serially encoded interrupt data signals. The 5-bit serially encoded interrupt data signals are then sent via a time division multiplex (TDM) transmission over the lead 20 of the ribbon cable 14 to all of the other shelves, and, in particular, to the first shelf 10 in a manner to be described hereinafter with FIG. 2. The serial-to-parallel encoder 18 in shelf 10 converts or demultiplexes any 5-bit serially encoded interrupt data signals received on lead 20 of the ribbon cable 14 into corresponding 8-bit parallel encoded interrupt data signals for transmission via leads 17 to the microprocessor 16. The microprocessor 16 is shown as having eight parallel ports (IM0 to IM7) coupled to separate ones of leads 17. The microprocessor 16 can comprise any suitable microprocessor such as, for example, the Intel i960 microprocessor.

The plurality of ports 22 in each of the four shelves 10, 11, 12, and 13 connect that shelf to external circuits (not shown) such as, for example, telephones, computers, etc. When an event occurs with any one of the ports 22 of the shelf 10, 11, 12, or 13 that requires action by the microprocessor 16, a coded interrupt data signal is sent to the microprocessor 16 from the associated shelf 10, 11, 12, or 13 defining which port 22 in that shelf is requesting the action. Once the coded interrupt data signal is received by the microprocessor 16 from one of the shelves 10, 11, 12, or 13, the microprocessor 16 acknowledges that it must take some action, and transmits control signals to the shelf 10, 11, 12, or 13 requesting the action by a port 22. Such control signals are sent from the microprocessor 16 on shelf 10 to the other shelves 11, 12, and 13 via leads (not shown) in the ribbon cable 14 other than lead 20. For purposes of discussion, and not for purposes of limitation, it is assumed hereinafter that each of the shelves 10, 11, 12, and 13 has sixteen ports 22.

Figure 2:
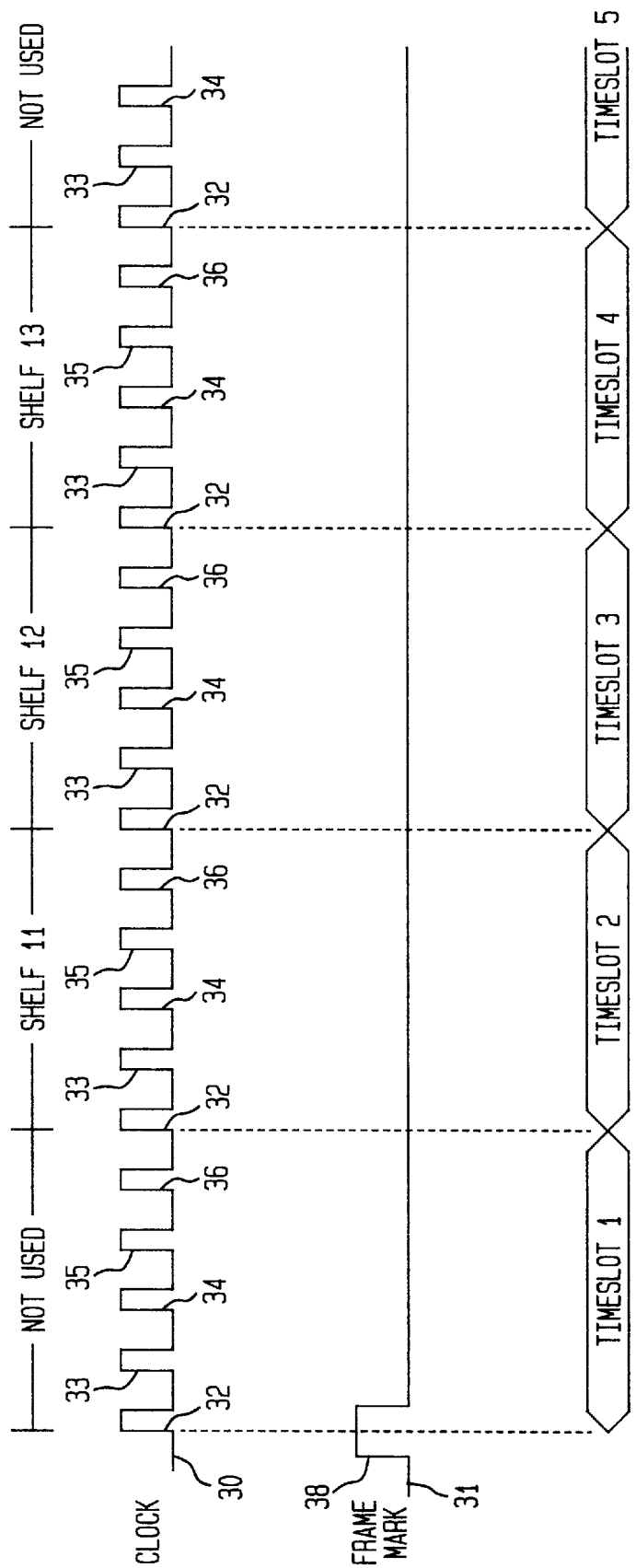
FIG. 2 is a diagram of a clock signal, a frame mark data signal, and assigned timeslots for use in transmitting serially encoded interrupt data signals between the shelves of FIG. 1 in accordance with the present invention.

Referring now to FIG. 2, there is shown a clock signal 30 and a frame mark signal 31 that are each used by the shelves 10, 11, 12, and 13 for transmitting serially encoded interrupt data signals via lead 20 of the ribbon cable 14 between the shelves 10, 11, 12, and 13 of FIG. 1 in accordance with the present invention. For purposes of discussion only, it is assumed hereinafter that the clock signal 30 is a 16 MHz clock signal with clock pulse cycles of 62.5 nanoseconds each, and the Frame Mark signal 31 includes a frame mark pulse every 125 microseconds to mark the start of a frame period. Therefore, in the above example, there are 2000 clock cycles per frame period which start once a rise time 38 of the frame mark pulse is detected.

In accordance with the present invention, the 2000 clock cycles of a frame period are divided into 400 sequential timeslots comprising 5 clock cycles each. The first timeslot (TIMESLOT 1) in a frame period, and every fourth time slot thereafter (timeslots 5, 9, 13, etc.), is not used (UNUSED) for the transmission of serial 5-bit interrupt data signals over lead 20 of the ribbon cable 14. The second timeslot (TIMESLOT 2) in each frame period, and every fourth time slot thereafter (timeslots 6, 10, 14, etc.), is assigned for the transmission of 5-bit interrupt data signals by shelf 11 over lead 20 of ribbon cable 14. The third timeslot (TIMESLOT 3) in each frame period, and every fourth time slot thereafter (timeslots 7, 11, 15, etc.), is assigned for the transmission of 5-bit interrupt data signals by shelf 12 over lead 20 of ribbon cable 14. The fourth timeslot (TIMESLOT 4) in each frame period, and every fourth time slot thereafter (timeslots 8, 12, 16, etc.), is assigned for the transmission of 5-bit interrupt data signals by shelf 13 over lead 20 of ribbon cable 14. More particularly, the first and each fourth timeslot thereafter are unused because these time slots would normally be assigned for the transmission of 5-bit interrupt data signals for shelf 10. However, the shelf 10 includes the microprocessor 16 for processing all interrupt data signals from all of the shelves 10–13. Therefore, any interrupt requests for action from the ports 22 of shelf 10 are sent directly to the serial-to-parallel encoder 18 in shelf 10 and then to the microprocessor 16 without the transmission of a 5-bit interrupt data signal via lead 20 of the ribbon cable 14. More particularly, the sequence of the first four timeslots shown in FIG. 2 are repeated 99 more times during a frame period comprising 2000 clock cycles.

Figure 3:
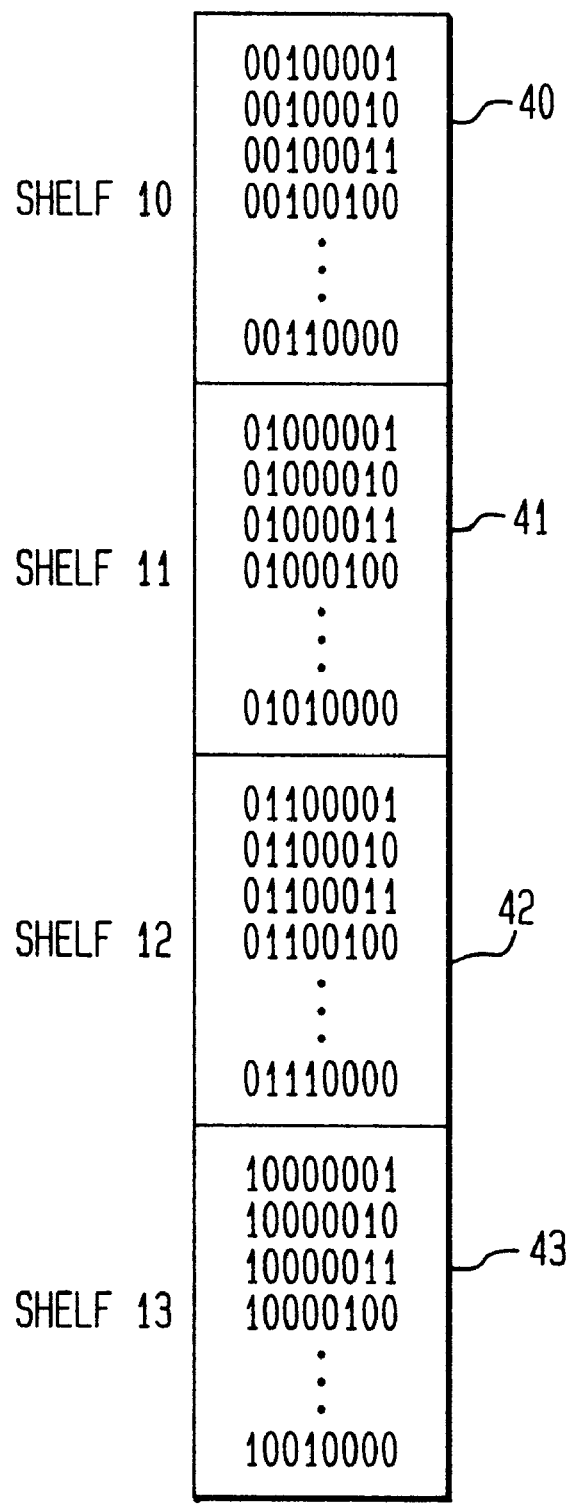
FIG. 3, is a listing of exemplary codes assigned to the shelves of FIG. 1 for use in transmitting interrupt data signals in accordance with the present invention.

Referring now to FIG. 3, there is shown a listing of four sets of exemplary interrupt data signal codes 40, 41, 42, and 43 assigned to shelves 10, 11, 12, and 13, respectively, of FIG. 1 in accordance with the present invention. Each of the sixteen ports 22 associated with shelf 10 in FIG. 1 are shown as being assigned a separate one of an exemplary set of sixteen 8-bit binary codes of 00100001 to 00110000, where the rightmost five bits of the 8-bit code indicate the binary number of the port 22, and the leftmost three bits of the 8-bit code indicate the binary number of the shelf the ports 22 are located on. Therefore, the 8-bit code of 00100010 is the code for the first shelf (corresponding to shelf 10) and the port 2 on shelf 10. Each of the sixteen ports of the shelf 11 are assigned separate ones of the 8-bit binary codes 01000001 to 01010000, each of the sixteen ports of the shelf 12 are assigned separate ones of the 8-bit binary codes 01100001 to 01110000, and each of the sixteen ports of the shelf 13 are assigned separate ones of the binary codes 10000001 to 10010000. It is to be understood that each of the rightmost 5-bit of the 8-bit binary codes that identifies a port includes at least one "1" therein to avoid a binary code of 00000, which is to be interpreted as there being no request for action from a particular shelf 11–13. Still further, it is to be understood that the 5-bit code can be used to identify 31 different ports on each shelf, or any number of ports between 16 and 31.

In operation, each of the sixteen ports in shelf 10 are coupled either directly or via a separate device (not shown) to the serial-to-parallel encoder 18 in shelf 10 via a separate lead. Similarly, each of the sixteen ports in the shelves 11, 12, and 13 are coupled either directly or via a separate device (not shown) to the parallel-to-serial encoder 21 in that same shelf via a separate lead. If a port 22 of any one of the shelves 10, 11, 12, or 13 is found to have a request for action, the port 22 or associated device (not shown but that monitors that port) provides a request signal (e.g., a predetermined high value) to the encoder 18 or 21 in that same shelf via the separate lead. For ports 22 in shelf 10, the serial-to-parallel encoder 18 in shelf 10 directly receives the request signal and converts that request signal into the 8-bit code associated with that port on shelf 10. For example, if the fourth port 22 on shelf 10 request an action, the lead associated with the fourth port 22 coupled to the serial-to-parallel encoder 18 in shelf 10 goes to the predetermined high value (e.g. a "1"). The serial-to-parallel encoder 18 in shelf 10 converts this received high signal to the 8-bit code of 00100100 and sends it in parallel to the microprocessor 16 via leads 17.

For any of the ports 22 in the shelves 11, 12, and 13 that have a request for action, the port 22 or associated device (not shown but that monitors that port) provides a request signal (e.g., a predetermined high value) to the parallel-to-serial encoder 21 in that same shelf via the separate lead. The parallel-to-serial encoder 21 in that same shelf recognizes which of the ports in that shelf 11, 12, or 13 is requesting an action by the associated lead which has a high signal, and generates a 5-bit code corresponding to the number of the port 22 requesting the action. The parallel-to-serial encoder 21 in the shelf 11, 12, or 13 transmits the generated 5-bit interrupt data code signal serially over lead 20 of ribbon cable 14 during separate clock cycles of a timeslot assigned to that shelf 11, 12, or 13. For example, if the third port 22 in shelf 12 requests an action, the lead associated with the third port 22 goes high which is recognized by the parallel-to-serial encoder 21 in the shelf 12. The parallel-to-serial encoder 18 in the shelf 12 generates the 5-bit code of 00011 corresponding to the third port 22, and transmits this 5-bit code via the lead 20 of the ribbon cable 14 during one of the timeslots 3, 7, 11, 15, etc., assigned to shelf 12. A first bit (e.g., the leftmost bit) of the 5-bit code is transmitted during the rise time 32 of the first clock cycle in an assigned timeslot. The second bit of the 5-bit code is transmitted during the rise time 33 of the second clock cycle in an assigned timeslot. The third bit of the 5-bit code is transmitted during the rise time 34 of the third clock cycle in an assigned timeslot. The fourth bit of the 5-bit code is transmitted during the rise time 35 of the fourth clock cycle in an assigned timeslot, and the fifth bit of the 5-bit code is transmitted during the rise time 36 of the fifth clock cycle in an assigned timeslot.

The serial-to-parallel encoder 18 in shelf 10 receives the 5-bit interrupt data code from lead 17 of ribbon cable 14, and generates an 8-bit interrupt data code corresponding to the shelf 11, 12, or 13 and the port 22 therein requesting the action. More particularly, the serial-to-parallel encoder 18 in shelf 10 recognizes which timeslot in a frame period includes a request for action and generates the 3-bit code corresponding to the shelf 11, 12, or 13 that is assigned to that timeslot. For example, if a request for action is received in timeslot 3 (assigned to shelf 12) of a frame period, the serial-to-parallel encoder 18 in shelf 10 recognizes that shelf 12 is transmitting an interrupt data signal and generates a 3-bit code of 011. This 3-bit code is then added in front of the 5-bit code received in that timeslot to produce the full 8-bit interrupt data code shown in FIG. 3. This 8-bit code is then sent via leads 17 to the microprocessor 16 to respond to the request for action.

It is to be appreciated and understood that the specific embodiments of the invention described hereinabove are merely illustrative of the general principles of the invention. Various modifications may be made by those skilled in the art which are consistent with the principles set forth. For example, the sets of codes 40, 41, 42, and 43 assigned to the shelves 10, 11, 12, and 13, respectively, in FIG. 3 are merely exemplary, and any other set of 8-bit codes which identify the shelf and port therein can be used. Still further, it is to be understood that the present invention is not limited to four shelves and 8-bit interrupt data codes, but can include any plurality of shelves and X-bit interrupt data codes that define which shelf and which port thereon is requesting an interrupt. Additionally, the elements on a shelf that are monitored for transmitting interrupt requests to a microprocessor 14 in accordance with the present invention need not be limited to just ports 22 but can be applied to any device other than a port on a shelf 10, 11, 12, or 13.

What is claimed is:

1. Apparatus for providing time division multiplex (TDM) transmissions of interrupt requests comprising:

a plurality of M shelves, where M is an integer greater than 1, coupled to a cable wherein one lead thereof is dedicated for the transmission of interrupt data signals to all of the other shelves, each shelf comprising:

a plurality of elements, each element being capable of transmitting an interrupt request signal in response to a need for an action therein; and encoding means for converting each received interrupt request signal from the plurality of elements into an X-bit encoded interrupt data signal which uniquely identifies the element on the shelf initiating the interrupt request, and for selectively transmitting the X-bit interrupt data signal to the other shelves over the one lead of the cable in a timeslot within a frame period that is dedicated to the shelf, where each timeslot comprises X clock cycles and each bit of the X-bit encoded interrupt data signal is serially transmitted during separate one of the X clock cycles in the timeslot assigned to the shelf, where X is an integer greater than 1; and a microprocessor mounted on a predetermined one of the plurality of shelves for processing a Y-bit signal that comprises the X-bit encoded interrupt data signal and a Z-bit code identifying the shelf from which the X-bit encoded interrupt data signal originated which is transmitted to the microprocessor from the encoding means located on the predetermined one of the plurality of shelves, where Z is an integer equal to or greater than 1, and Y is an integer equal to or greater than X+Z.

2. The apparatus of claim 1 wherein the encoding means is an encoder comprising a serial terminal coupled to the one lead of the cable and a plurality of parallel terminals, where the plurality of parallel terminals of the encoder mounted on the predetermined one of the plurality of shelves are coupled to a corresponding plurality of parallel inputs of the microprocessor.

3. The apparatus of claim 2 wherein each of the plurality of parallel terminals of the encoder that is mounted on a shelf other than the predetermined one of the plurality of shelves is coupled to receive an interrupt request signal from a separate one of elements on that same shelf.

4. The apparatus of claim 1 wherein the cable is a ribbon cable comprising a plurality of leads.

5. The apparatus of claim 1 wherein each shelf is responsive to both clock and frame mark signals which are common to all shelves for timing the transmission of the X-bit encoded interrupt data signal during the separate timeslot that is assigned to that shelf in a frame period.

6. The apparatus of claim 5 wherein the bits of the X-bit encoded interrupt data signal are serially transmitted during rise times of the X successive clock cycles of the timeslot.

7. The apparatus of claim 1 wherein each frame period comprises a plurality of timeslots subdivided into a integer number of groups of M timeslots, where each shelf is assigned to a separate one of the timeslots of each group of M timeslots during each frame period for transmitting a separate X-bit interrupt data signal over the one lead of the cable to the other shelves.

8. Apparatus for providing time division multiplex (TDM) transmissions of interrupt requests comprising:

a plurality of M shelves, where M is an integer greater than 1, coupled in parallel by a cable of which one lead is dedicated for the transmission of interrupt data signals to each of the other shelves, each shelf comprising:

a plurality of elements that are each monitored and transmit an interrupt request signal in response to a need for an action therein; and an encoder comprising a plurality of parallel terminals and a serial terminal that is coupled to the one lead of the cable, the encoder is adapted for receiving and converting each interrupt request signal received from the plurality of elements into an X-bit encoded interrupt data signal that identifies the element on the shelf requesting the interrupt, and for selectively transmitting the X-bit interrupt data signal over the one lead of the cable in a timeslot within a frame period that is dedicated to the shelf, where each timeslot comprises X clock cycles and each bit of the X-bit encoded interrupt data signal is serially transmitted over the one lead of the cable during a separate one of the X clock cycle of a timeslot during a frame period assigned to each shelf, where X is an integer greater than 1; and a microprocessor mounted on a predetermined one of the plurality of shelves for processing a Y-bit interrupt data signal which is transmitted to the microprocessor in parallel from the encoder located on the predetermined one of the plurality of shelves, the Y-bit signal comprising the X-bit encoded interrupt data signal identifying the element on a shelf requesting an interrupt and a Z-bit code identifying the shelf from which the X-bit encoded interrupt data signal originated as determined from the timeslot in which the X-bit interrupt data signal is received, where Z is an integer equal to or greater than 1, and Y is an integer equal to or greater than X+Z.

9. The apparatus of claim 8 wherein each of the plurality of parallel terminals of the encoder which is mounted on a shelf other than the predetermined one of the plurality of shelves is coupled to receive interrupt data signals from a separate one of elements on that same shelf.

10. The apparatus of claim 8 wherein the cable is a ribbon cable comprising a plurality of leads.

11. The apparatus of claim 8 wherein each shelf is responsive to both clock and frame mark signals which are common to all shelves for timing the transmission of the X-bit encoded interrupt data signal during a separate timeslot that is assigned to that shelf in a frame period.

12. The apparatus of claim 11 wherein the bits of the X-bit encoded interrupt data signal are serially transmitted during rise times of the X successive clock cycles of the timeslot.

13. The apparatus of claim 8 wherein each frame period comprises a plurality of timeslots subdivided into a integer number of groups of M timeslots, where each shelf is assigned to a separate one of the timeslots of each group of M timeslots during each frame period for transmitting a separate X-bit interrupt data signal over the one lead of the cable to the other shelves.

14. A method of providing time division multiplex (TDM) transmissions of interrupt requests comprising the steps of:

(a) coupling a plurality of M shelves, where M is an integer greater than 1, to a cable wherein one lead thereof is dedicated for the transmission of interrupt data signals to all of the other shelves;

(b) transmitting an interrupt request signal from an element on any one of the plurality of M shelves to an encoding means mounted on that same shelf in response to a request for action in the element;

(c) converting the interrupt request signal received in the encoding means in step (b) into an X-bit encoded interrupt data signal which uniquely identifies the element on the shelf initiating the interrupt request, where X is an integer greater than 1;

(d) selectively transmitting the X-bit encoded interrupt data signal generated in step (c) over the one lead of the cable to all of the other shelves during a predetermined timeslot within a frame period that is dedicated to the shelf, where each timeslot comprises X clock cycles and each bit of the X-bit encoded interrupt data signal is serially transmitted during a separate one of the X clock cycles in the timeslot assigned to the shelf; and (e) receiving the X-bit encoded interrupt data signal transmitted in step (d) in an encoding means mounted on a predetermined one of the plurality of shelves and generating a Y-bit signal that is transmitted to a microprocessor mounted on the predetermined one of the plurality of shelves comprising the received X-bit encoded interrupt data signal and a Z-bit code identifying the shelf from which the X-bit encoded interrupt data signal originated, where Z is an integer equal to or greater than 1, and Y is an integer equal to or greater than X+Z.

15. The method of claim 14 wherein in step (d), the bits of the X-bit encoded interrupt data signal are serially transmitted during rise times in X successive clock cycles of the timeslot.

16. The method of claim 14 wherein in step (d) each frame period comprises a plurality of timeslots subdivided into a integer number of groups of M timeslots, where each shelf is assigned to a separate one of the timeslots of each group of M timeslots during each frame period for transmitting a separate X-bit interrupt data signal over the one lead of the cable to the other shelves.

* * * * *